United States Patent [19]

Murphy et al.

[11] 4,416,750

[45] Nov. 22, 1983

[54] ULTRAVIOLET CURABLE BASECOATS FOR VACUUM METALLIZATION

[75] Inventors: Edward J. Murphy, Mt. Prospect; Ronald J. Lewarchik, Arlington Hgts.; Jeffrey W. Thompson, Homewood, all of Ill.

[73] Assignee: DeSoto, Inc., Des Plaines, Ill.

[21] Appl. No.: 311,057

[22] Filed: Oct. 13, 1981

[51] Int. Cl.$^3$ ..................... C08G 18/00; C08G 63/00
[52] U.S. Cl. ............................... 204/159.19; 525/920
[58] Field of Search .................. 204/159.19; 525/920

[56] References Cited

U.S. PATENT DOCUMENTS 4,048,036 9/1977 Prucnal ........................ 204/159.19
4,188,455 2/1980 Howard ........................ 204/159.19

Primary Examiner—Theodore Morris
Attorney, Agent, or Firm—Dressler, Goldsmith, Shore, Sutker & Milnamow, Ltd.

[57] ABSTRACT

An ultraviolet light-curable liquid coating composition for molded plastic objects is disclosed. The composition is a liquid mixture of a polyurethane oligomer polyacrylate and an hydroxy-functional polyacrylate ester. The polyacrylate ester is present in an amount of 5% to 95% of total polyacrylate. The composition is preferably in solution in alcoholic solvent having a solids content of from 40% to 90%. A photoinitiator is included to render the composition curable upon exposure to ultraviolet light.

1 Claim, No Drawings

ULTRAVIOLET CURABLE BASECOATS FOR VACUUM METALLIZATION

DESCRIPTION

1. Field of Invention

This invention relates to ultraviolet light-curable basecoats for thermoplastic molded objects to prepare them for vacuum metallization.

2. Background Art

Thermoplastic molded objects, particularly those intended for use on the exterior of automobiles, are decorated by vacuum metallization to provide a bright and shiny metallic appearance. However, these molded parts frequently lack the smooth surface needed to obtain the desired bright and shiny finish, so the molded parts are coated to improve surface smoothness, and the coating is baked to cure the same. Baking at low temperature not exceeding about 170° F. is required because the molded plastic parts are damaged by exposure to higher temperature. However, a baking time of about 2 hours is needed at 170° F., and this holds up production and introduces large oven requirements and energy costs which are detrimental. Moreover, the prior basecoats exhibit poor humidity and salt spray resistance evidenced by delamination of the metal deposit.

The use of ultraviolet light-cured coatings is known to eliminate the need for an extended bake, but ultraviolet-cured coatings normally include residual volatile material, and thus would not be regarded as capable of withstanding a vacuum metallization process because the loss of volatiles would disrupt the coating and impair the desired bright and shiny finish. Thus, while light-cured coatings constitute a known way of eliminating prolonged baking, such coatings would not normally be regarded to be applicable to the problem under consideration.

DISCLOSURE OF INVENTION

In accordance with this invention, an ultraviolet light-curable light coating composition for molded plastic objects comprises a liquid mixture of: (1) a polyurethane oligomer polyacrylate; and (2) an hydroxyfunctional polyacrylate ester; the polyacrylate ester being present in an amount of from 5% to 95%, more preferably from 20% to 50% of total polyacrylate. Ultraviolet curing systems normally contain no volatile organic solvent, but the preferred coating compositions of this invention contain alcoholic organic solvent providing a solids content of 40% to 90%, preferably from 60% to 80%. A photoinititor is added to render the coating composition curable upon exposure to ultraviolet light (which includes visible light near the ultraviolet range).

All proportions are by weight unless otherwise noted.

The resulting solution is dip or spray applied and the wet-coated article is exposed to ultraviolet light which provides a rapid cure, usually in 5 to 60 seconds.

Photoinitiator selection is subject to wide variation, as is well known in the ultraviolet cure of acrylate-containing liquids. Ketonic photoinitiators are preferred, such as those of the acetophenone type. The selection of photoinitiators is not a critical aspect of this invention. The acetophenone photoinitiator provided by Ciba-Geigy Corporation under the name Irgacure 651 is preferred and will be used in some of the examples. From 2–10%, preferably from 5–8% photoinitiator is usually appropriate.

The polyurethane oligomer polyacrylates are well known materials which are usually prepared by reacting a low molecular weight, organic solvent-soluble, hydroxy functional polyester with excess organic polyisocyanate (usually a diisocyanate like toluene diisocyanate) to form an isocyanate-terminated polyurethane which is then reacted with an hydroxy alkyl acrylate, such as 2-hydroxyethyl acrylate, to consume the isocyanate functionality and thus provide a plurality of terminal unsaturated acrylate groups. Similar products can be made in various ways and well known in the art.

Preferred polyurethane oligomer polyacrylates in this invention are based on polyesters having an average molecular weight of from 500 to 1500 and having more than about 1.5 hydroxy groups per molecule, preferably at least about 2.0 hydroxy groups per molecule. Each hydroxy group in the polyester is bonded to an acrylate group through a plurality of urethane linkages to provide the desired polyacrylate polyurethane oligomers under consideration.

The hydroxy-functional polyacrylate ester can be constituted by an organic polyol having a molecular weight below 500 and having at least about 3 hydroxy groups per molecule which is esterified with at least about 1.5 mols of acrylic acid per mol of polyol, preferably at least about 2.0 mols of acrylic acid on the same basis. The esterification goes to substantial completion to remove most of the unreacted acrylic acid, and at least about 0.5 hydroxy groups per molecule are left unreacted. These polyacrylate esters are illustrated by trimethylol propane diacrylate and pentaerythritol triacrylate. The residual hydroxy functionality promotes adhesion to both plastic and metal, so the substitution of trimethylol propane triacrylate for the corresponding diacrylate is not satisfactory. Glycerin diacrylate can also be used to illustrate a polyacrylate ester of relatively low molecular weight, and a diacrylate of diglycidyl ether of bisphenol A having a molecular- weight of about 375 illustrates a polyacrylate of higher molecular weight. These higher molecular weight polyacrylates can be provided by the reaction of a polyepoxide with acrylic acid to produce alpha hydroxy esters.

In the preferred solvent-containing compositions, the use of alcohols is normally needed to avoid attacking the plastic which is coated. Small amounts of another solvent, up to about 25% of total solvent, may be constituted a more active solvent, like butyl acetate or methyl ethyl ketone, but the system should remain largely alcoholic to minimize solvent attack of the substrate. When water miscible alcohols are employed, like ethanol, some water may be tolerated, though this increases the dry time needed prior to cure.

The coating composititons which are contemplated may be applied in various ways, as by spray or by dipping. Dipping is particularly preferred herein.

The molded objects are dipped into a bath of the coating solution and excess solution is drained off, usually back into the bath. Adequate drainage usually takes 1 to 2 minutes. The object is then dried to remove the solvent which is preferably present and thereby provide a tacky uniform film. This takes about 5 to 15 minutes in air, or the dry can be speeded by blowing warm air on the object. In this way one can carry out the required drying in about 3 to 5 minutes.

It will be appreciated that the dip procedure automatically controls the coating thickness and uniformity and it avoids the spray losses which are encountered when some of the spray particles do not deposit upon the object to be coated.

The tacky film is a solid film, but touching with the fingers will leave an observable print thereon.

The films which are formed on air drying to remove the bulk of the volatile solvents which are preferably present are then exposed to ultraviolet light causing a rapid cure. Typical cure times are 10 to 15 seconds using an ultraviolet source supplying an intensity of 1.0 to 3.0 Joules/cm$^2$.

The cured films obtained by this invention are very uniform. The edge coverage is good, and the coatings flow well to provide a smooth surface which allows the subsequently applied metal film to be bright and shiny.

The vacuum metallization process is itself well-known, the process being normally carried out using a metal or metal alloy, such as aluminum or chromium. The vacuum metallization process is well known and encompasses evaporative as well as sputtering techniques.

The invention is illustrated in the examples which follow:

EXAMPLE 1

| Component | Parts by Weight |
|---|---|
| Acrylated polyurethane oligomer (see note 1) | 27 |
| Pentaerythritol triacrylate | 79 |
| Dimethoxy phenyl acetophenone (note 2) | 8 |
| Methanol | 25 |
| Isopropanol | 12 |
| Butanol | 12 |
| Total = | 163 |

The product has a solids content of 70% and a #2 Zahn viscosity of 20 seconds at room temperature.

Note 1—A polyester of adipic acid and propylene glycol of molecular weight 1000 and an hydroxyl equivalent weight of 500 reacted with excess aliphatic diisocyanate and then with hydroxyethyl acrylate (Thiokol product Uvithane 788 may be used).

Note 2—Ciba Geigy product Iragacure 651 may be used.

EXAMPLE 2

| Component | Parts by Weight |
|---|---|
| Acrylated polyurethane oligomer (see note 1) | 30 |
| Bisphenol A epoxy diacrylate (see note 3) | 30 |
| Pentaerythritol triacrylate | 40 |
| Benzophenone | 3 |
| Diethoxy acetophenone | 3 |
| Methanol | 37 |
| Isopropyl alcohol | 10 |
| Butyl acetate | 10 |
| Total = | 163 |

Note 3—The commercial product Celrad 3700 from Celanese may be used.

The product has a solids content of 65% and a #2 Zahn viscosity of 23 seconds at room temperature.

EXAMPLE 3

| Component | Parts by Weight |
|---|---|
| Acrylated polyurethane oligomer (see note 1) | 53 |
| Pentaerythritol triacrylate | 53 |
| Benzophenone | 4 |
| Dimethoxy phenyl acetophenone (note 2) | 4 |
| Methanol | 30 |
| Isopropanol | 19 |
| Butanol | 12 |
| Total = | 175 |

The product has a solids content of 65% and a #2 Zahn viscosity of 20 seconds at room temperature.

EXAMPLE 4

| Component | Parts by Weight |
|---|---|
| Acrylated polyurethane oligomer (see note 1) | 53 |
| Pentaerythritol triacrylate | 53 |
| Dimethoxy phenyl acetophenone (note 2) | 8 |
| Methanol | 30 |
| Isopropanol | 15 |
| Butanol | 8 |
| Butyl acetate | 8 |

The product has a solids content of 65% and a #2 Zahn viscosity of 20 seconds. It is appropriate for dip application, draining, drying and ultraviolet cure as previously described.

EXAMPLE 5

| Component | Parts by Weight |
|---|---|
| Acrylated polyurethane oligomer (see note 4) | 85 |
| Pentaerythritol triacrylate | 5 |
| Phenoxy ethyl acrylate | 10 |
| Benzophenone | 2 |
| Diethoxyacetophenone | 4 |
| Isopropanol | 47 |
| Butanol | 24 |
| Total = | 177 |

Note 4—The commercial product Uvimer 530 of Polychrome Corp. may be used.

This Example 5 product has a solids content of 60% and a #2 Zahn viscosity of 20 seconds at room temperature.

EXAMPLE 6

| Component | Parts by Weight |
|---|---|
| Acrylated polyurethane oligomer (see note 4) | 70 |
| Bisphenol A epoxy diacrylate (see note 5) | 15 |
| Pentaerythritol triacrylate | 15 |
| Dimethoxy phenyl acetophenone (note 2) | 6 |
| Isopropanol | 41 |
| Butanol | 20 |
| Butyl acetate | 10 |
| Total = | 177 |

Note 5—The commercial product DRH 370 from Shell Chemical may be used.

The product of this example has a solids content of 60% and a #2 Zahn viscosity of 22 seconds at room temperature.

EXAMPLE 7

| Component | Parts by Weight |
| --- | --- |
| Acrylated polyurethane Oligomer (see note 4) | 15 |
| Bisphenol A epoxy diacrylate (see note 5) | 75 |
| Phenoxy ethyl acrylate | 10 |
| Dimethoxy phenyl acetophenone (note 2) | 6 |
| Isopropanol | 25 |
| Butyl acetate | 10 |
| Total = | 141 |

This product has a solids content of 75% and a #2 Zahn viscosity of 23 seconds at room temperature.

EXAMPLE 8

| Component | Parts by Weight |
| --- | --- |
| Acrylated polyurethane oligomer (see note 6) | 186 |
| Pentaerythritol triacrylate | 14 |
| Dimethoxy phenyl acetophenone (see note 2) | 16 |
| Isopropanol | 122 |
| Butanol | 23 |
| Total = | 361 |

Note 6—A polyester of trimethylol propane and adipic acid having a molecular weight of 800 and an hydroxyl equivalent weight of about 266 reacted with excess aliphatic diisocyanate and then with hydroxyethyl acrylate. The commercial product Uvimer 775 of Polychrome Corp. of Newark, New Jersey may be used.

The aliphatic diisocyanates referred to hereinbefore are constituted by dicyclohexyl methane 4,4'-diisocyanate. Hylene W supplied by Mobay may be used.

This Example 8 has a solids content of 55% and a #2 Zahn viscosity of 25 seconds. It is also appropriate for dip application, draining, drying and ultraviolet cure as previously described.

EXAMPLE 9

| Component | Parts by Weight |
| --- | --- |
| Acrylated polyurethane oligomer (see note 6) | 10 |
| Pentaerythritol polyacrylate (see note 7) | 80 |
| Phenoxy ethyl acrylate | 10 |
| Dimethoxy phenyl acetophenone (see note 2) | 6 |
| Total = | 106 |

Note 7—The commercial product ZA1192 from Thiokol may be used.

The product of this Example 9 has a solids content of 100% and a #2 Zahn viscosity of 65 seconds at room temperature and 26 seconds at 100° F.

As will be evident, small amounts of extraneous materials, such as monoacrylates like 2-hydroxyethyl acrylate, or polyacrylates like diethylene glycol diacrylate, soluble or insoluble resin particles, fillers, flow control agents, and the like may be present. Also, and while it is preferred to apply the liquid composition at room temperature, heat can be used to reduce the viscosity or to assist in the elimination of all or a portion of the volatile organic solvent.

What is claimed is:

1. An ultraviolet light-curable liquid coating composition for molded plastic objects comprising an alcoholic solvent solution of:

1—a polyurethane oligomer polyacrylate which is a derivative of an organic solvent-soluble hydroxy functional polyester having an average molecular weight of 500–1500 and an average of at least about 2.0 hydroxy groups per molecule, each hydroxy group carrying an acrylate ester group by a plurality of urethane linkages; and 2—an hydroxy-functional polyacrylate which is constituted by an organic polyol having a molecular weight below 500 and at least about 3 hydroxy groups per molecule, said polyol being esterified to contain at least about 1.5 acrylate ester groups per molecule and having at least about 0.5 unreacted hydroxy groups per molecule;

said polyacrylate ester being present in an amount of from 20–50% of total polyacrylate, and said solution having a solids content of from 60% to 80%, said solution further including a photoinitiator to render the composition curable on exposure to ultraviolet light.

* * * * *